US012686081B2

(12) United States Patent
Moritsugu et al.

(10) Patent No.: US 12,686,081 B2
(45) Date of Patent: Jul. 21, 2026

(54) METHOD FOR MANUFACTURING JOINED BODY

(71) Applicant: FUTABA INDUSTRIAL CO., LTD., Okazaki (JP)

(72) Inventors: Norifumi Moritsugu, Okazaki (JP); Takaaki Uno, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 549 days.

(21) Appl. No.: 18/317,984

(22) Filed: May 16, 2023

(65) Prior Publication Data

US 2023/0381891 A1 Nov. 30, 2023

(30) Foreign Application Priority Data

May 26, 2022 (JP) ................................. 2022-086012

(51) Int. Cl.
*B23K 26/26* (2014.01)
*B23K 26/244* (2014.01)
(Continued)

(52) U.S. Cl.
CPC ............ *B23K 26/244* (2015.10); *B23K 26/26* (2013.01); *B23K 26/32* (2013.01); *B23K 2101/18* (2018.08); *B23K 2103/10* (2018.08)

(58) Field of Classification Search
CPC .. B23K 26/244; B23K 2103/10; B23K 26/26; B23K 26/32
See application file for complete search history.

(56) References Cited

U.S. PATENT DOCUMENTS 2,354,921 A * 8/1944 McClary .................. B65D 7/36
220/619
2,455,737 A * 12/1948 Coyle .................... B21D 51/34
220/619
(Continued)

FOREIGN PATENT DOCUMENTS

EP 0030072 A2 6/1981
JP S5680698 A 7/1981
(Continued)

OTHER PUBLICATIONS

Notice of Reasons for Refusal in Japanese Patent Application No. 2022-086012 mailed Apr. 23, 2024, 10 pages.
(Continued)

*Primary Examiner* — Nathaniel E Wiehe
*Assistant Examiner* — Theodore C Ribadeneyra
(74) *Attorney, Agent, or Firm* — Withrow + Terranova, PLLC; Vincent K. Gustafson

(57) ABSTRACT

A method for manufacturing a joined body including two plate-like portions, the method including forming a joint part that comprises at least a portion of each of the two plate-like portions and joins the two plate-like portions; and irradiating the joint part with a beam, thereby to perform laser welding. The joint part includes at least one folded part, the at least one folded part is a bent part that is bent so as to be folded back in one of the two plate-like portions. First and second bases are formed at both ends of the bent part to face each other such that at least a portion of the other of the two plate-like portions is arranged between the first and second bases, the other of the two plate-like portions including no bent part.

1 Claim, 6 Drawing Sheets

(51) Int. Cl.
    *B23K 26/32*         (2014.01)
    *B23K 101/18*       (2006.01)
    *B23K 103/10*       (2006.01)

(56)           References Cited

U.S. PATENT DOCUMENTS

| | | | | |
|---|---|---|---|---|
| 3,912,154 | A * | 10/1975 | Godar | B65D 15/06 |
| | | | | 229/5.5 |
| 4,758,704 | A * | 7/1988 | Kogel | B23K 26/244 |
| | | | | 219/121.64 |
| 4,854,467 | A * | 8/1989 | Budenbender | B21D 51/32 |
| | | | | 220/612 |
| 5,513,767 | A * | 5/1996 | Daehn | B65D 83/70 |
| | | | | 220/89.2 |
| 6,102,243 | A * | 8/2000 | Fields | B21D 51/38 |
| | | | | 220/619 |
| 6,194,041 | B1 * | 2/2001 | McHenry | B29C 48/185 |
| | | | | 220/62.12 |
| 7,370,774 | B2 * | 5/2008 | Watson | B65D 17/08 |
| | | | | 220/619 |

| | | | | |
|---|---|---|---|---|
| 7,772,518 | B2 * | 8/2010 | Rajesh | B65B 7/2857 |
| | | | | 219/121.64 |
| 2005/0230364 | A1 | 10/2005 | Wang et al. | |
| 2013/0113237 | A1 * | 5/2013 | Huhn | B62D 25/04 |
| | | | | 296/193.06 |
| 2015/0145241 | A1 * | 5/2015 | Asami | B23K 26/282 |
| | | | | 219/121.64 |

FOREIGN PATENT DOCUMENTS

| | | | |
|---|---|---|---|
| JP | S61130793 | A | 6/1986 |
| JP | S6317393 | A | 1/1988 |
| JP | H2123326 | U | 10/1990 |
| JP | H0569166 | A | 3/1993 |
| JP | H11123582 | A | 5/1999 |
| JP | 2005169450 | A | 6/2005 |

OTHER PUBLICATIONS

First Office Action for Chinese Patent Application No. 202310588325.5 mailed Oct. 1, 2025, 13 pages.

* cited by examiner

METHOD FOR MANUFACTURING JOINED BODY

CROSS-REFERENCE TO RELATED APPLICATIONS

This application claims the benefit of Japanese Patent Application No. 2022-086012 filed on May 26, 2022 with the Japan Patent Office, the entire disclosure of which is incorporated herein by reference.

BACKGROUND

The present disclosure relates to a method for manufacturing a joined body through laser welding.

When workpieces are joined by laser welding, it is required to arrange the workpieces while reducing a gap in a welding region, in order to reduce welding failures such as cracks and blowholes. As one example, Japanese Unexamined Patent Application Publication No. H11-123582 discloses a technique for holding two aluminum workpieces to be laser-welded by a jig so as to be in contact with each other with a minimal gap in a welding region of the workpieces.

SUMMARY

However, in the technique disclosed in Japanese Unexamined Patent Application Publication No. H11-123582, an area of the workpieces held by the jig cannot be irradiated with a beam, which causes limitation of the area of the workpieces where laser welding can be performed.

One aspect of the present disclosure, it is desirable to suitably inhibit welding failures caused by laser welding.

One aspect of the present disclosure provides a method for manufacturing a joined body comprising two plate-like portions that are plate-shaped portions, the method comprising forming a joint part that comprises at least a portion of each of the two plate-like portions and joins the two plate-like portions; and irradiating the joint part with a beam, thereby to perform laser welding. The joint part comprises at least one folded part, the at least one folded part being defined as a bent part that is bent so as to be folded back in one of the two plate-like portions, and a first base and a second base are formed at both ends of the bent part to face each other such that at least a portion of the other of the two plate-like portions is arranged between the first base and the second base, the other of the two plate-like portions including no bent part.

With the aforementioned configuration, it is possible to inhibit formation of a gap between the two plate-like portions included in the joint part. Thus, a portion where the gap between the two plate-like portions is inhibited can be melted by irradiating the joint part with the beam in a laser welding process. Accordingly, welding failures caused by laser welding can be suitably reduced by laser welding.

In one aspect of the present disclosure, the joint part may be provided so as to protrude from one of the two plate-like portions. The beam may irradiate the joint part from a side where a protruding part of the joint part is situated.

With the aforementioned configuration, it is possible to inhibit laser welding from causing burn-through.

In one aspect of the present disclosure, the joined body may comprise a first member and a second member, the first member comprising one of the two plate-like portions, the second member comprising the other of the two plate-like portions. A flow path for a fluid may be formed between the first member and the second member.

With the aforementioned configuration, it is possible to inhibit a fluid from passing through the joint part to flow out.

In one aspect of the present disclosure, the at least one folded part may comprise two folded parts formed on a portion included in the joint part of one of the two plate-like portions, and also the at least one folded part may comprise one folded part formed on a portion included in the joint part of the other of the two plate-like portions.

The aforementioned configuration enables seal performance and joint strength in the joint part to be improved.

In one aspect of the present disclosure, in the laser welding, the beam may irradiate the joint part along a facing direction of the first and second bases.

The aforementioned configuration enables the two plate-like portions to be suitably weld.

In one aspect of the present disclosure, the two plate-like portions may be made of metal comprising aluminum as a main component.

The aforementioned configuration enables a welding failure to be suitably reduced.

In one aspect of the present disclosure, the joined body may further comprise a main body part adjacent to the joint part. The first base may be adjacent to the main body part. Through the laser welding, the first base may be welded to a portion of the other of the two plate-like portions adjacent to the first base.

The aforementioned configuration enables separation of the two plate-like portions from each other.

In one aspect of the present disclosure, the joined body may further comprise a main body part adjacent to the joint part. The joint part may extend in a specific direction. In the laser welding, the beam may irradiate a portion of the joint part closer to the main body part than a center in a width direction of the joint part. The width direction may be defined as a direction orthogonal to an extending direction of the joint part and to a facing direction of the first and second bases.

With the aforementioned configuration, it is possible to suitably inhibit separation of the first and second plate-like portions from each other.

BRIEF DESCRIPTION OF THE DRAWINGS

An embodiment of the present disclosure will be described hereinafter by way of example with reference to the accompanying drawings, in which.

DETAILED DESCRIPTION OF EXEMPLARY EMBODIMENTS

The present disclosure is not limited to the embodiments explained hereinafter and may be modified in various modes within the technical scope of the present disclosure.

First Embodiment

1. Outline

Figure 1:
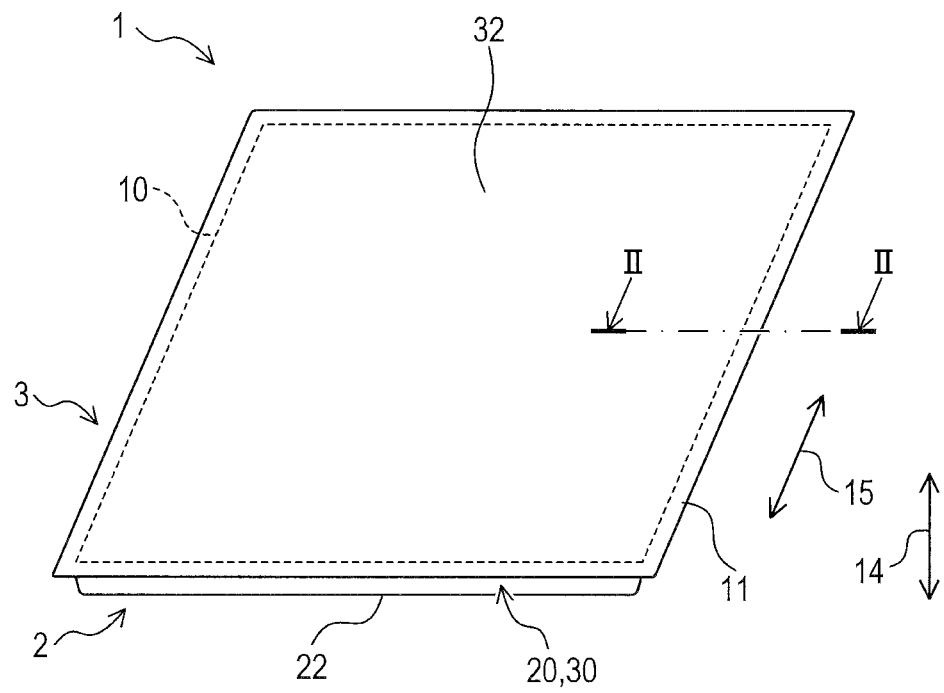
FIG. 1 is a perspective view of a joined body in a first embodiment.

A joined body 1 in a first embodiment is a quadrangular flat member, and is configured as a cooling device to be mounted on a vehicle (see FIG. 1). The joined body 1 comprises a first member 2 and a second member 3 each having a quadrangular plate-shaped member and arranged to overlap each other. The first and second members 2 and 3 may be made of various metals (for example, iron and stainless steel). However, the first and second members 2 and 3 may be made of metals that tend to cause welding failures (for example, cracks and blowholes) in a laser welding process (described below) or to be easily deformed plastically in a joining process (described below). Specifically, the first and second members 2 and 3 may be made of metals, for example, a metal containing aluminum as a main component (in other words, aluminum or aluminum alloy), or copper.

The first member 2 comprises a first plate-like portion 20 and a depression 22. The first plate-like portion 20 is a planar part that is situated along a periphery of the first member 2 and extends in a surrounding manner. The depression 22 is quadrangular and is surrounded by the first plate-like portion 20. The shape of the depression 22 is not limited to a quadrangle and may be determined as appropriate. The first plate-like portion 20 and the depression 22 have a difference in level, and the depression 22 is provided so as to be depressed from the first plate-like portion 20.

The second member 3 comprises a second plate-like portion 30 and a center portion 32. The second plate-like portion 30 is a planar part that is situated along a periphery of the second member 3 and extends in a surrounding manner. The center portion 32 is quadrangular and is surrounded by the second plate-like portion 30.

Figure 2:
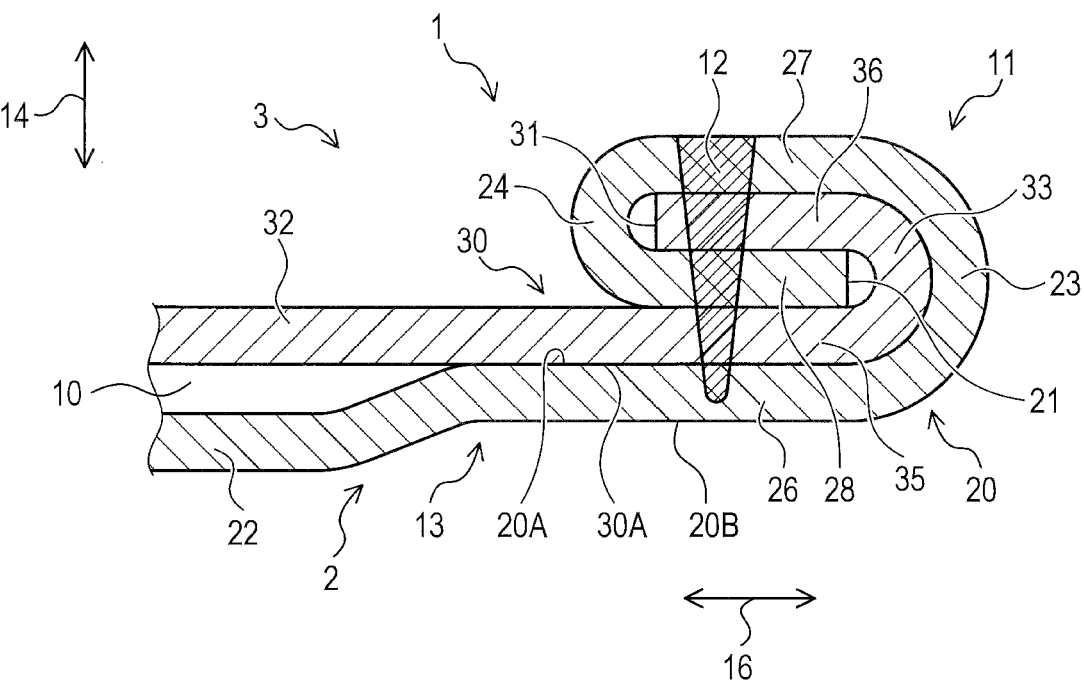
FIG. 2 is a cross-sectional view along II-II in FIG. 1.

The first and second members 2 and 3 are arranged such that an inner surface 20A of the first plate-like portion 20 and an inner surface 30A of the second plate-like portion 30 face each other along a facing direction 14 (see FIG. 2). The first and second plate-like portions 20 and 30 are provided with a joint part 11 on a periphery of the joined body 1 (in other words, the first and second members 2 and 3). The joint part 11 extends along the periphery of the joined body 1 in a surrounding manner, and joins the first plate-like portion 20 and the second plate-like portion 30.

The depression 22 and the center portion 32 face each other in the facing direction 14 with a flat gap between the first and second plate-like portions 20 and 30. This gap forms a flow path 10 for a fluid (for example, a cooling water) serving as a refrigerant. The joined body 1 comprises two or more openings (not shown). The cooling water flows into and out of the flow path 10 through the openings.

Hereinafter, a direction in which the joint part 11 extends is referred to as an extending direction 15. Further, a direction orthogonal to the facing direction 14 and the extending direction 15 is referred to as a width direction 16. Furthermore, a portion of the joined body 1 other than the joint part 11 is referred to as a main body part 13. The main body part 13 is positioned on an inner side relative to the joint part 11, and comprises the depression 22, the center portion 32, a portion of the first plate-like portion 20, and a portion of the second plate-like portion 30.

2. Joint Part

The joint part 11 is provided so as to protrude from the second plate-like portion 30 along the facing direction 14 (see FIGS. 1 and 2). Although details will be described below, the joint part 11 is formed by seaming at least a portion of the first plate-like portion 20 and at least a portion of the second plate-like portion 30.

A portion included in the joint part 11 of the first plate-like portion 20 comprises a first A folded part 23, a first B folded part 24, a first A base 26, a first B base 27, and a first C base 28. The first A folded part 23 forms an outer edge of the joined body 1, and is positioned between the first A base 26 and the first B base 27. The first B folded part 24 is closer to the main body part 13 than the first A folded part 23, and is positioned between the first B base 27 and the first C base 28. The first A base 26 is adjacent to the main body part 13. An end face 21 of the first plate-like portion 20 is included in the first C base 28.

A portion included in the joint part 11 of the second plate-like portion 30 comprises a second A folded part 33, a second A base 35, and a second B base 36. The second A folded part 33 is adjacent to the first A folded part 23 on a side of the first A folded part 23 closer to the main body part 13, and is positioned between the second A base 35 and the second B base 36. The second A base 35 is adjacent to the main body part 13. An end face 31 of the second plate-like portion 30 is included in the second B base 36.

Each of the folded parts 23, 24 and 33 is bent to be folded back such that the respective bases at both ends face each other along the facing direction 14. Each of the folded parts 23, 24, and 33 has a curved shape, but is not limited and may have a bent shape. The bases 26 through 28, 35, and 36 overlap each other along the facing direction 14. The second B base 36 is arranged between the first B base 27 and the first C base 28. The first C base 28 is arranged between the second A base 35 and the second B base 36. The first C, second A, and second B bases 28, 35, and 36 are arranged between the first A and first B bases 26 and 27.

Further, the joint part 11 comprises a welded portion 12 formed by solidifying a portion melted by laser welding. The welded portion 12 is formed to bridge between the first plate-like portion 20 and the second plate-like portion thereby to seal a gap between the first and second plate-like portions 20 and 3. Method for Manufacturing Joined Body A manufacturing process of the joined body 1 comprises an arrangement process, a joining process, and a laser welding process.

(1) Arrangement Process

Figure 3:
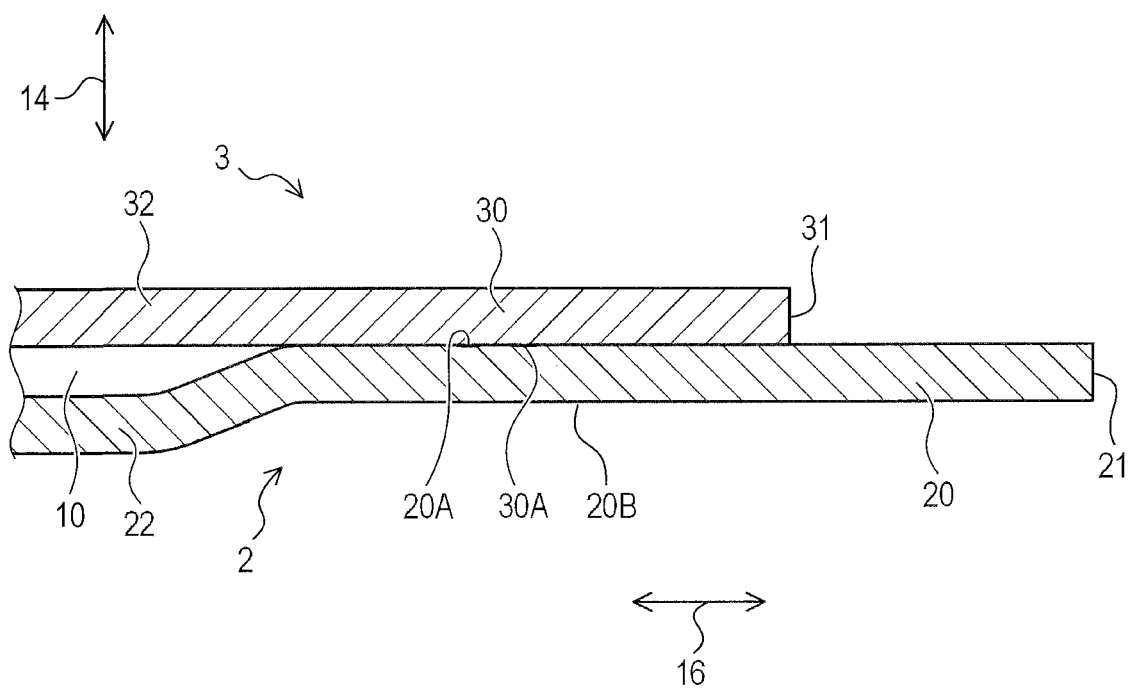
FIG. 3 is a cross-sectional view along a plane orthogonal to an extending direction of first and second plate-like portions, in an arrangement process in the first embodiment.

In the arrangement process, the first and second members 2 and 3 without the joint part 11 are arranged to overlap each other along the facing direction 14 such that the inner surfaces 20A and 30A of the first and second plate-like portions 20 and 30 are in contact with each other (see FIG. 3). At this time, an end face 31 of the second member 3 is adjacent to the first plate-like portion 20. Also, the flow path 10 is formed between the depression 22 and the center portion 32 at this time.

(2) Joining Process

Figure 4:
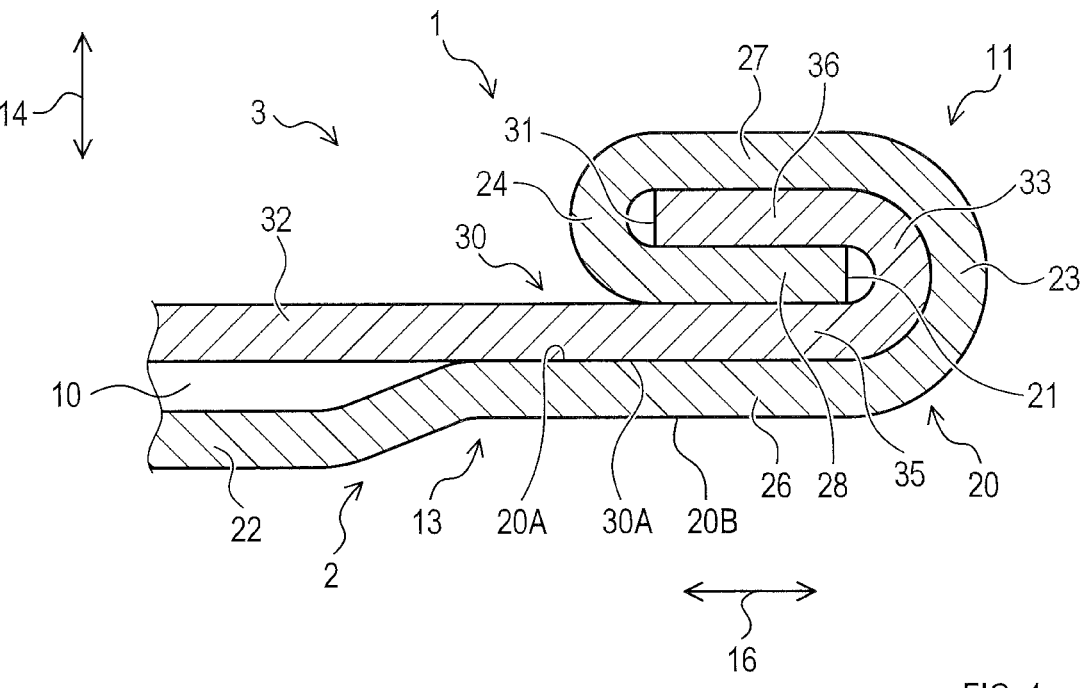
FIG. 4 is a cross-sectional view along a plane orthogonal to an extending direction of a joint part, in a joining process in the first embodiment.

In the subsequent joining process, the first and second plate-like portions 20 and 30 arranged to overlap each other are deformed, thereby to form the joint part 11 (see FIG. 4). As one example, first, the first B folded part 24 may be formed by bending the first plate-like portion 20 such that the first plate-like portion 20 is folded back, and the second B base 36 may be arranged between the first B and first C bases 27 and 28 situated on both sides of the first B folded part 24. Thereafter, the first A and second A folded parts 23 and 33 may be formed by bending the first and second plate-like portions 20 and 30 such that the first and second plate-like portions 20 and 30 are folded back. Also, the first C base 28 may be arranged between the second A and second B bases 35 and 36, and the first C, second A, and second B bases 28, 35, and 36 may be arranged between the first A and first B bases 26 and 27. However, the joint part 11 is not limited and may be formed in various methods.

(3) Laser Welding Process

Figure 5:
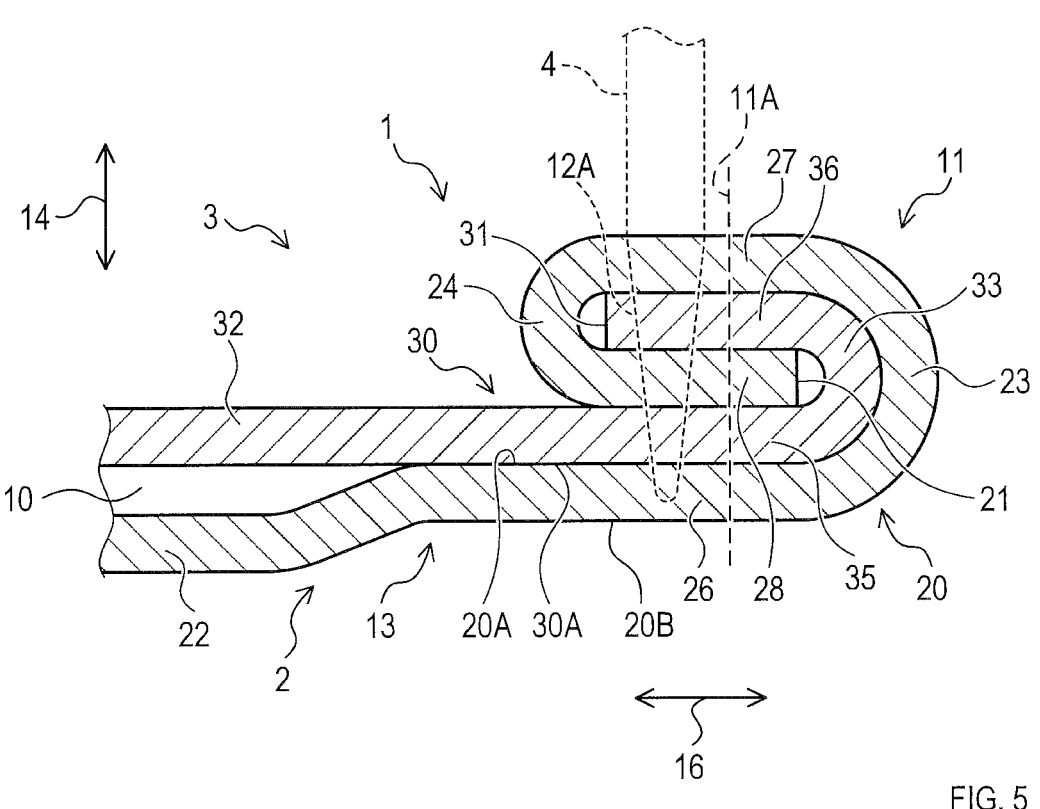
FIG. 5 is a cross-sectional view along the plane orthogonal to the extending direction of the joint part, in a laser welding process in the first embodiment.

In the subsequent laser welding process, laser welding is performed on the joint part 11 by irradiating the joint part 11 with a beam 4 (see FIG. 5). The beam 4 irradiates a full section of the joint part 11 extending along the periphery of the joined body 1. That is, the welded portion 12 is formed on the full section of the joint part 11. Further, an adjacent portion of the first and second plate-like portions 20 and 30 in the joint part 11 is welded by laser welding. As one example, a light source of the beam 4 is positioned, with respect to the first and second plate-like portions 20 and 30, on a side where a protruding part of the joint part 11 is situated (in other words, on a second plate-like portion 30 side), and the beam 4 irradiates the joint part 11 along the facing direction 14. The beam 4 may irradiate the joint part 11 along an inclined direction with respect to the facing direction 14. Alternatively, if the joint part 11 is provided so as to protrude on a first plate-like portion 20 side, the laser light source of the beam 4 may be disposed on the first plate-like portion 20 side.

Further, the beam 4 irradiates a portion of the joint part 11 closer to the main body part 13 than a center 11A of the joint part 11 in the width direction 16. At this time, the beam 4 irradiates the first B base 27, but may irradiate the first B folded part 24.

Moreover, as one example, a melted portion (hereinafter, referred to as "melted part 12A") is formed by laser welding, passing from the first B base 27 to the first A base 26 through the first C, second A, and second B bases 28, 35, and 36. At this time, the melted part 12A does not reach an outer surface 20B opposite to the inner surface 20A in the first A base 26. Accordingly, it is possible to inhibit burn-through, thereby to inhibit welding failures such as cracks and blowholes from occurring in the welded portion 12.

(4) Modified Example of Laser Welding

In laser welding, the melted part 12A may reach the outer surface 20B of the first A base 26. The melted part 12A does not have to reach the first A base 26. As long as the melted part 12A reaches at least the second B base 36, the adjacent portion of the first and second plate-like portions 20 and 30 in the joint part 11 is welded.

The beam 4 may irradiate a portion of the joint part 11 situated on a side opposite to the main body part 13 relative to the center 11A in the width direction 16 (hereinafter, an "outer side"). At this time, the beam 4 may irradiate the first B base 27, or may irradiate the first A folded part 23.

Alternatively, the beam 4 may irradiate the joint part 11 from the first plate-like portion 20 side. In this case, the beam 4 may irradiate a portion closer to the main body part 13 than the center 11A in the first A base 26 or on the outer side, or may irradiate the first A folded part 23.

Figure 6:
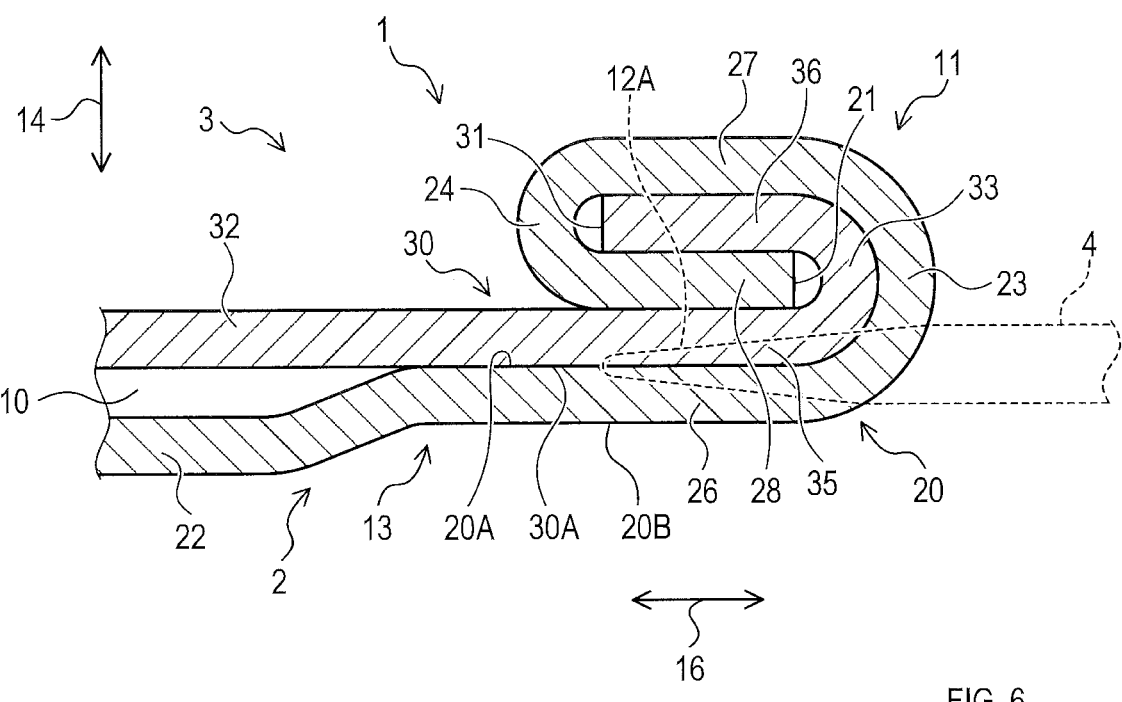
FIG. 6 is a cross-sectional view along the plane orthogonal to an extending direction of a joint part, in a modification example of a laser welding process of the first embodiment.

Further, the beam 4 may be emitted along various directions, which are different from the facing direction 14. As one example, the beam 4 may irradiate the first A folded part 23 along the width direction 16. In this case, the beam 4 may be emitted such that the melted part 12A is formed along boundaries between the bases of each of the first and second plate-like portions 20 and 30, for example, a boundary between the first A base 26 and the second A base 35 (see FIG. 6). This enables a portion in the welded portion 12 across the boundaries between the first and second plate-like portions 20 and 30 to be made larger, thereby to increase joint strength.

Figure 7:
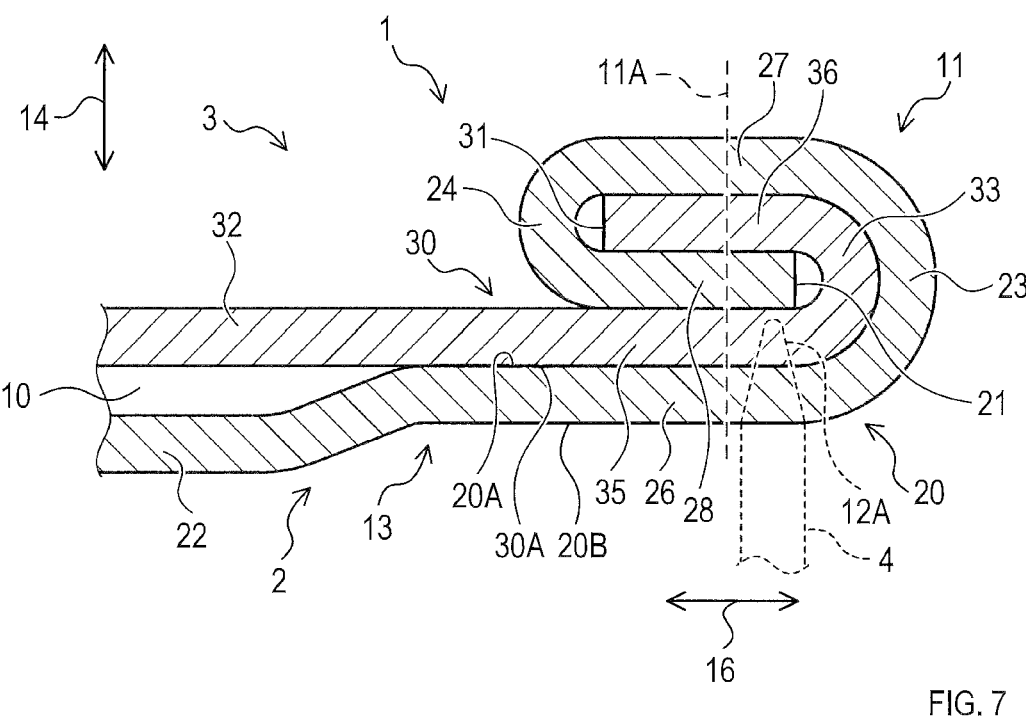
FIG. 7 is a cross-sectional view along the plane orthogonal to an extending direction of a joint part, in a modification example of the laser welding process of the first embodiment.

The beam 4 may irradiate a portion near the folded part in the bases. As one example, the beam 4 may irradiate a portion near the first A folded part 23 in the first A base 26 (see FIG. 7) or may irradiate a portion near the first A folded part 23 in the first B base 27. The beam 4 may irradiate the folded parts. Accordingly, it is possible to weld a portion where a gap between the first and second plate-like portions 20 and 30 in the joint part 11 is inhibited. Further, even if there is a variation in positions of the end faces 21 and 31 of the first and second plate-like portions 20 and 30, and a hollow is generated near the end faces 21 and 31 within the joint part 11, it is possible to weld the portion where the gap is inhibited.

Second Embodiment

4. Overview

Figure 8:
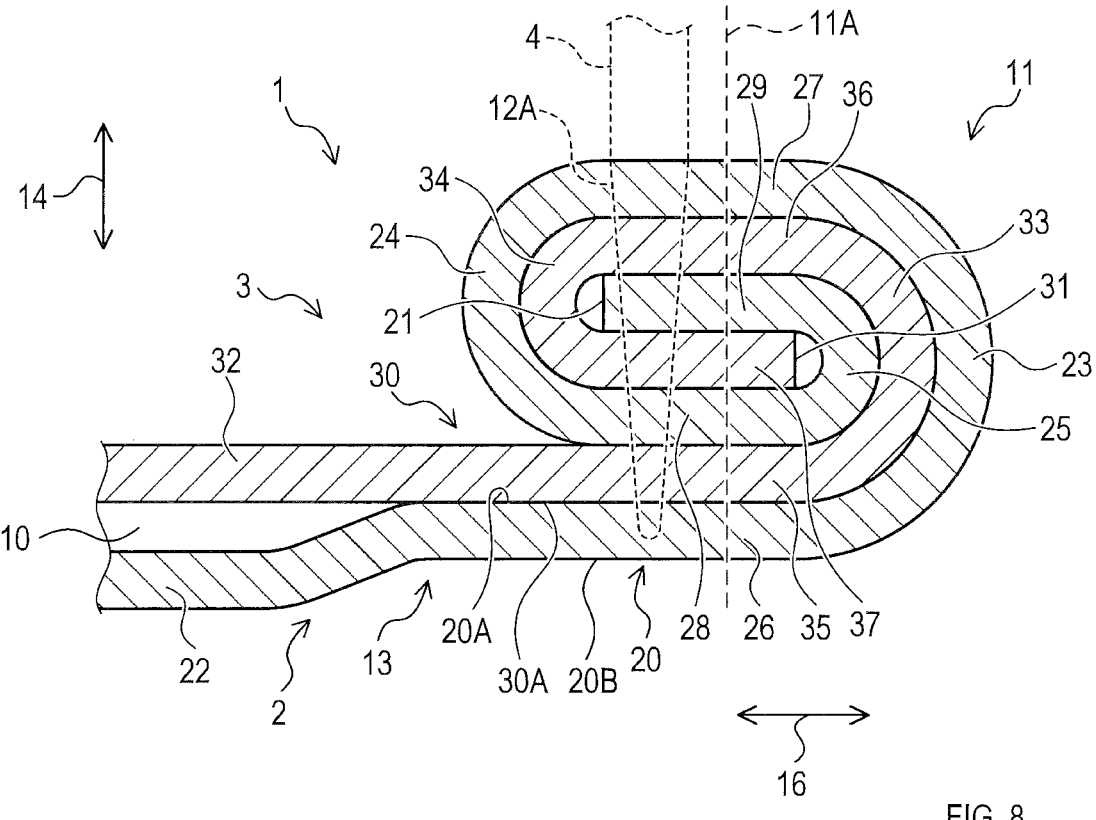
FIG. 8 is a cross-sectional view along a plane orthogonal to an extending direction of a joint part, in a laser welding process in a second embodiment.

The joined body 1 of the second embodiment has a configuration similar to that of the first embodiment, but the joint part 11 of the second embodiment has a configuration different from that of the first embodiment (see FIG. 8). The joint part 11 of the first embodiment is formed by seaming. However, the joint part 11 of the second embodiment is formed by seaming and thereafter folding and bending the first and second plate-like portions 20 and 30 (details will be described below). The joint part 11 is formed in such a manner, and thereby seal performance and joint strength are improved. Differences in the joined body 1 of the second embodiment from the first embodiment are described below.

5. Joint Part

In the second embodiment, a portion included in the joint part 11 of the first plate-like portion 20 comprises the first A through first C folded parts 23 through 25, the first A through first C bases 26 through 28, and a first D base 29 (see FIG. 8). The first A folded part 23 forms the outer edge of the joined body 1, and is positioned between the first A base 26 and the first B base 27. The first B folded part 24 is closer to the main body part 13 than the first A folded part 23, and is positioned between the first B base 27 and the first C base 28. The first C folded part 25 is positioned between the first A folded part 23 and the first B folded part 24, and between the first C base 28 and the first D base 29. The first A base 26 is adjacent to the main body part 13. The end face 21 of the first plate-like portion 20 is included in the first D base 29.

Further, a portion included in the joint part 11 of the second plate-like portion 30 comprises the second A folded part 33 and a second B folded part 34, the second A base 35, the second B base 36, and a second C base 37. The second A folded part 33 is adjacent to the first A folded part 23 on the side of the first A folded part 23 closer to the main body part 13, and is positioned between the second A base 35 and the second B base 36. The second B folded part 34 is closer to the main body part 13 than the second A folded part 33, and is positioned between the second B base 36 and the second C base 37. The second A base 35 is adjacent to the main body part 13. The end face 31 of the second plate-like portion 30 is included in the second C base 37.

The bases 26 through 29 and 35 through 37 overlap each other along the facing direction 14 as in the first embodiment. The joint part 11 comprises the welded portion 12 similar to that of the first embodiment.

6. Method for Manufacturing Joined Body

In the second embodiment, the joined body 1 is manufactured through the arrangement process, the joining process, the laser welding process as in the first embodiment. However, the second embodiment is different from the first embodiment in the joining process and the laser welding process. Differences in those process are described below.

(1) Joining Process

In the joining process, the first and second plate-like portions 20 and 30 arranged so as to overlap in the arrangement process are deformed, thereby to form the joint part 11 (see FIG. 8). As one example, the seaming may be first performed as in the first embodiment, thereby to form a joint part (hereinafter, referred to as a "seam part") similar to that of the first embodiment. Thereafter, the overlapped first and second plate-like portions 20 and 30 are bent such that the seam part is folded back to form a folded part, and thereby the joint part 11 may be formed. However, the joint part 11 is not limited, and may be formed by various methods.

(2) Laser Welding Process

In the subsequent laser welding process, laser welding is performed on the joint part 11 by irradiating the joint part 11 with the beam 4 (see FIG. 8), as in the first embodiment. In the second embodiment, as in the first embodiment, the beam 4 irradiates, from the second plate-like portion 30 side, a portion of the joint part 11 that is situated closer to the main body part 13 than the center 11A in the width direction 16. Further, the melted part 12A is formed to reach the first A base 26 from the first B base 27 through the first C, first D, second A to second C bases, but does not reach the outer surface 20B of the first A base 26.

However, the second embodiment is not limited to the above configuration, and an orientation of the beam 4, a portion to be irradiated with the beam 4, a position where the melted part 12A is formed may be determined as appropriate in the same manner as that described in the first embodiment.

Third Embodiment

7. Overview

Figure 9:
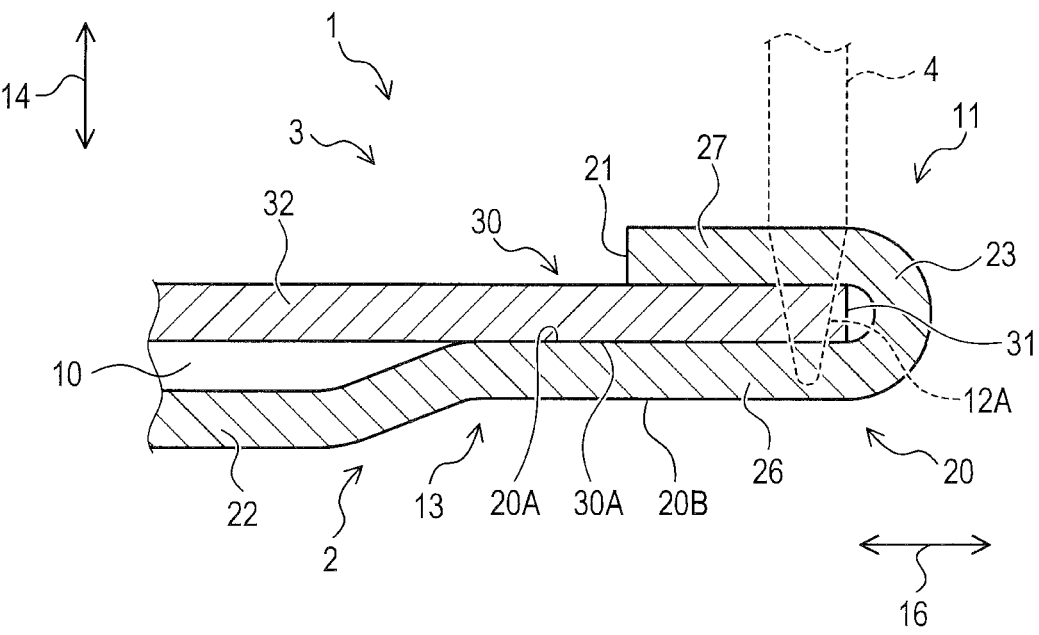
FIG. 9 is a cross-sectional view along a plane orthogonal to an extending direction of a joint part, in a laser welding process in a third embodiment.

The joined body 1 of the third embodiment has a configuration similar to that of the first embodiment, but the joint part 11 of the third embodiment has a hemming structure, which is a different point from the joint part 11 of the first embodiment (see FIG. 9). Employment of the hemming structure enables the joining process to be simplified. Differences in the joined body 1 of the third embodiment from the first embodiment are described below.

8. Joint Part

In the third embodiment, a portion included in the joint part 11 of the first plate-like portion 20 comprises the first A folded part 23, the first A and first B bases 26 and 27 (see FIG. 9). The first A folded part 23 forms the outer edge of the joined body 1 and is positioned between the first A base 26 and the first B base 27. The first A base 26 is adjacent to the main body part 13. The end face 21 of the first plate-like portion 20 is included in the first B base 27.

Further, the portion included in the joint part 11 of the second plate-like portion 30 comprises neither a folded part nor a base.

The first A and first B bases 26 and 27 overlap a portion near the end face 31 of the second plate-like portion 30 along the facing direction 14, and this portion is arranged between the first A base 26 and the first B base 27.

Further, the joint part 11 comprises the welded portion 12 similar to that of the first embodiment.

9. Method for Manufacturing Joined Body

In the third embodiment, the joined body 1 is manufactured through the arrangement process, the joining process, and the laser welding process as in the first embodiment. However, the third embodiment is different from the first embodiment in the joining process and the laser welding process. The following describes these process below.

(1) Joining Process

In the joining process, the first and second plate-like portions 20 and 30 arranged so as to overlap each other in the arrangement process are deformed, thereby to form the joint part 11 (see FIG. 9). As one example, the first plate-like portion 20 may be bent so as to be folded back, thereby to form the first A folded part 23, and the second plate-like portion 30 may be arranged between the first A and first B bases 26 and 27 situated on both sides of the first A folded part 23. However, the joint part 11 is not limited, and may be formed by various methods.

(2) Laser Welding Process

In the subsequent laser welding process, laser welding is performed on the joint part 11 by irradiating the joint part 11 with the beam 4 (see FIG. 9), as in the first embodiment. In the third embodiment, the beam 4 irradiates, from the second plate-like portion 30 side, a portion of the first B base 27 near the first A folded part 23. Further, the melted part 12A is formed by laser welding so as to reach the first A base 26 from the first B base 27 through the second plate-like portion 30, but the melted part 12A does not reach the outer surface 20B of the first A base 26. Alternatively, for example, the beam 4 irradiates, from the first plate-like portion 20 side, a portion of the first A base 26 near the first A folded part 23.

However, the third embodiment is not limited to the above configuration, and an orientation of the beam 4, a portion to be irradiated with the beam 4, a position where the melted part 12A is formed, and so forth may be determined in the same manner as those described in the first and second embodiments.

Fourth Embodiment

10. Overview

The joined body 1 of the fourth embodiment has a configuration similar to the third embodiment, but the second plate-like portion 30 included in the joint part 11 has a configuration different from that of the first embodiment (see FIG. Differences in the joined body 1 of the fourth embodiment from the third embodiment are described below.

11. Joint Part

Figure 10:
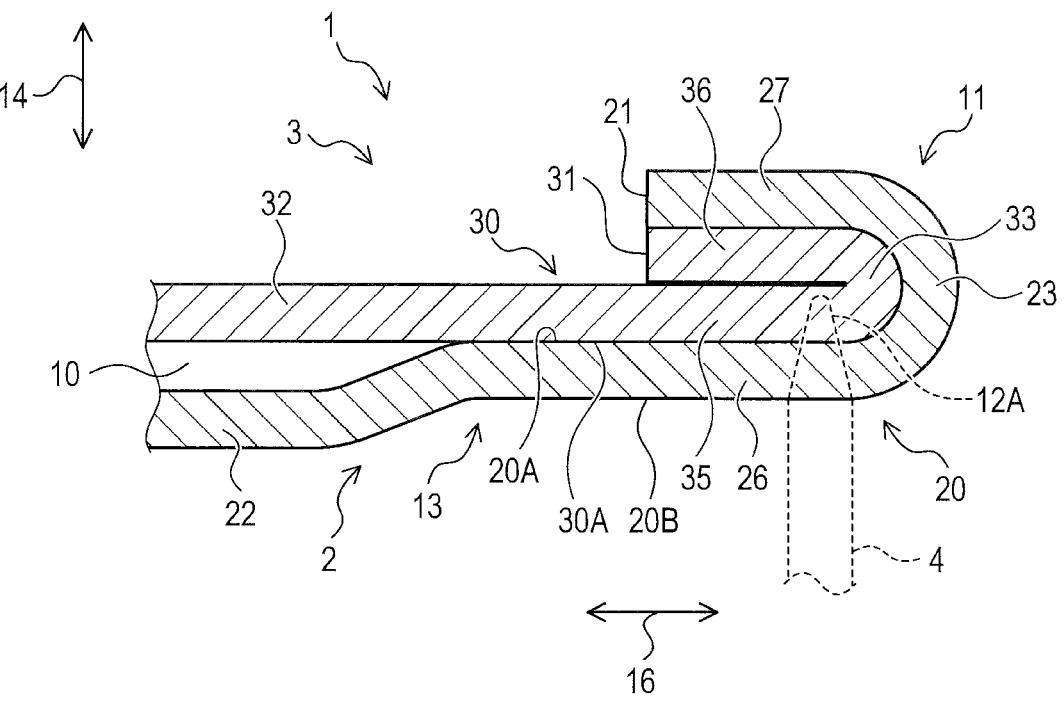
FIG. 10 is a cross-sectional view along a plane orthogonal to an extending direction of a joint part, in a laser welding process in a fourth embodiment.

In the fourth embodiment, a portion included in the joint part 11 of the first plate-like portion 20 comprises the first A folded part 23, and the first A and first B bases 26 and 27 similar to those of the third embodiment (see FIG. 10).

On the other hand, a portion included in the joint part 11 of the second plate-like portion 30 comprises the second A folded part 33 and the first A and first B bases 35 and 36. The second A base 35 is adjacent to the main body part 13. The end face 31 of the second plate-like portion 30 is included in the second B base 36. Also, the second A and second B bases 35 and 36 face each other along the facing direction 14 so as to be in contact with each other, or be separated with a small gap.

The first A and first B bases 26 and 27 are overlapped with the second A and second B bases 35 and 36 along the facing direction 14. The second A and second B bases 35 and 36 are arranged between the first A and first B bases 26 and 27. The first A folded part 23 and the second A folded part 33 are arranged adjacent to each other.

Further, the joint part 11 comprises the welded portion 12 similar to that of the third embodiment.

12. Method for Manufacturing Joined Body

In the fourth embodiment, the joined body 1 is manufactured through the arrangement process, the joining process, and the laser welding process as in the third embodiment. However, the fourth embodiment is different from the third embodiment in the joining process and the laser welding process. The following describes these process below.

(1) Joining Process

In the joining process, the first and second plate-like portions 20 and 30 arranged so as to overlap each other in the arrangement process are deformed, thereby to form the joint part 11 (see FIG. 10). As one example, first, the second A folded part 33 may be formed by bending the second plate-like portion such that the second plate-like portion 30 is folded back. Thereafter, the first A folded part 23 may be formed by bending the first plate-like portion 20 such that the first plate-like portion 20 is folded back. The second A folded part 33 of the second plate-like portion 30 and the second A and second B bases 35 and 36 may be arranged between the first A and first B bases 26 and 27. However, the joint part 11 is not limited and may be formed by various methods.

(2) Laser Welding Process

In the subsequent laser welding process, laser welding is performed on the joint part 11 by irradiating the joint part 11 with the beam 4 (see FIG. 10), as in the third embodiment. However, in the fourth embodiment, the beam 4 irradiates, from the first plate-like portion 20 side, a portion of the first A base 26 near the first A folded part 23. Further, the melted part 12A is formed to reach the second A base 35 from the first A base 26 by laser welding. Alternatively, for example, the beam 4 may irradiate, from the second plate-like portion 30 side, a portion of the first B base 27 near the first A folded part 23.

However, the fourth embodiment is not limited to the above configuration, and an orientation of the beam 4, a portion to be irradiated with the beam 4, a position where the melted part 12A is formed, and so forth may be determined in the same manner as those described in the first through third embodiments.

13. Effects (1) In the first through fourth embodiments, it is possible to inhibit formation of a gap between the first plate-like portion 20 and the second plate-like portion 30 that are included in the joint part 11. Thus, a portion where the gap between the first plate-like portion 20 and the second plate-like portion 30 is inhibited can be melted by irradiating the joint part 11 with the beam 4 in the laser welding process. Accordingly, for example, welding failures caused by laser welding can be reduced without use of a jig that causes the first plate-like portion 20 and the second plate-like portion 30 to be in close contact with each other to reduce a gap of the portion. Further, the first plate-like portion 20 and the second plate-like portion 30 are joined through the joint part 11, resulting in improving seal performance and joint strength.

(2) In laser welding process, the beam 4 is emitted from the second plate-like portion 30 side where the joint part 11 protruding is positioned. This can inhibit the melted part 12A from reaching the outer surface 20B of the first A base 26, thereby to inhibit burn-through from occurring.

(3) The flow path 10 is disposed near the joint part 11, and the seal performance in the joint part 11 is improved by laser welding. Accordingly, it is possible to inhibit a cooling water flowing in the flow path 10 from passing through the joint part 11 to flow out.

(4) In the first embodiment, the joint part 11 is formed by seaming. Accordingly, it is possible to improve seal performance and joint strength while reducing the gap between the first plate-like portion 20 and the second plate-like portion 30 of the joint part 11.

(5) In the laser welding process, the beam 4 is emitted along the facing direction 14, and thus the bases overlapped along the facing direction 14 can be suitably welded.

(6) The first and second plate-like portions 20 and 30 are made of aluminum or aluminum alloy, and thus a welding failure is suitably reduced.

(7) In the laser welding process, the first A base 26 and the second A base 35, which are adjacent to the main body part 13, are welded, and a portion of the joint part 11 closer to the main body part 13 than the center 11A in the width direction 16 is welded. This allows the first and second plate-like portions 20 and 30 in the joint part 11 to be welded near the main body part 13. Therefore, for example, even if a force that causes separation of the first and second members 2 and 3 from each other is applied due to influences or the like of the cooling water flowing through the flow path 10, it is possible to suitably inhibit the first and second plate-like portions 20 and 30 from separating with each other.

14. Other Embodiments (1) The joined body 1 of the first through fourth embodiments is configured as a cooling device to be mounted on a vehicle. However, the joined body 1 may be any device other than the cooling device, and may be configured as, for example, a heat exchanger to be mounted on a vehicle, or a pipe such as an exhaust pipe through which an exhaust gas flows down in a vehicle. As in the first through fourth embodiments, such device is provided with a joint part of members that form a flow path for a fluid serving as a heat medium, and/or for an exhaust gas, and thereby the same effects can be achieved. Further, the joined body 1 may be configured as a device not to be mounted on a vehicle, or a device without a flow path for a fluid. Even in those cases, the devices with the joint part can achieve the same effects as those of the above embodiments.

(2) The joint part 11 is formed so as to protrude from the second plate-like portion 30, but the present disclosure is not limited, and may be formed so as to protrude from the first plate-like portion 20. The joint part 11 need not to be provided so as to surround the joined body 1, nor formed along the periphery of the joined body 1. The first and second plate-like portions 20 and 30 are not limited to a flat shape and may have, for example, a curved shape.

Figure 11:
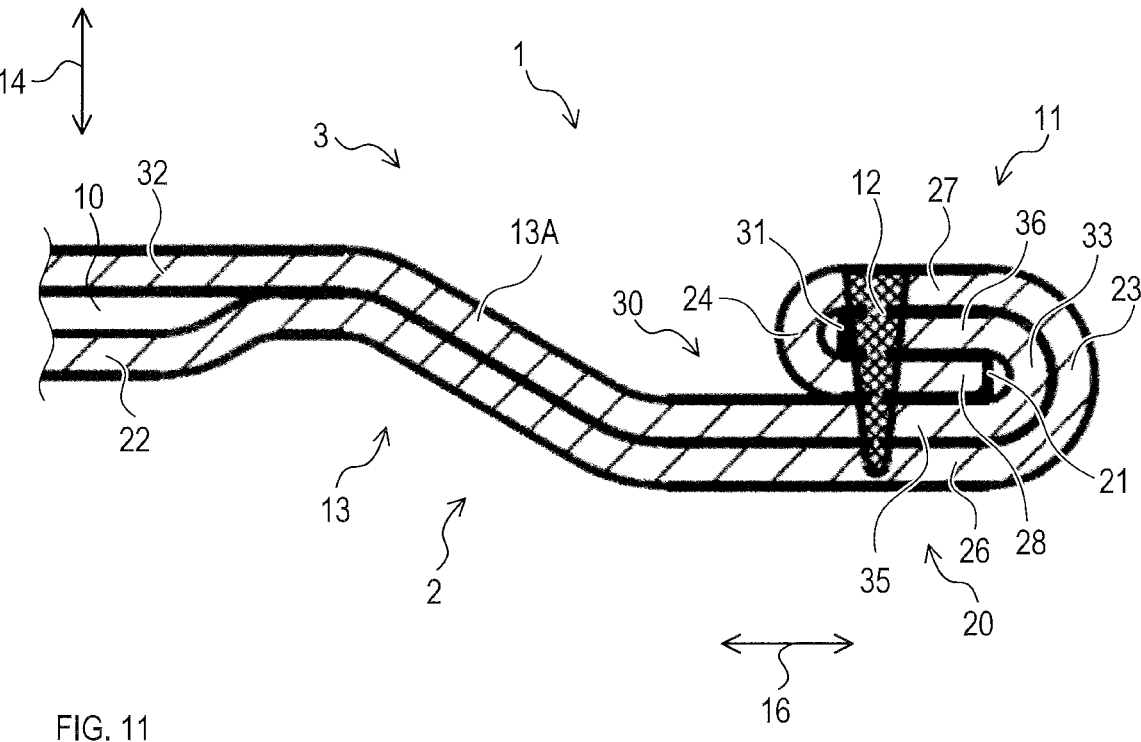
FIG. 11 is a cross-sectional view along the plane orthogonal to an extending direction of a joint part, in a modification example of the joined body in the first embodiment.

(3) In the first through fourth embodiments, a slope portion 13A may be provided at a position closer to the joint part 11 than the flow path 10 in the main body part 13 (see FIG. 11). Herein, a side where the first member 2 is positioned is defined as a first side, and a side where the second member 3 is positioned is defined as a second side. The slope portion 13A is curved toward the first side as the slope portion 13A is closer to the joint part 11. As one example, as shown in FIG. 11, the slope portion 13A may be bent such that the joint part 11 is positioned closer to the first side than a surface on the second side of the second plate-like portion 30 where the main body part 13 is situated. However, the slope portion 13A may be a curved shape. This can inhibit the joint part 11 from obstructing attachment of the joined body 1.

Further, in the manufacturing process of the joined body 1, a time for performing the process of forming the slope portion 13A may be set as appropriate. Specifically, for example, a portion corresponding to the slope portion 13A may be formed on each of the first and second members 2 and 3, before the arrangement process. Alternatively, for example, the slope portion 13A may be formed between the arrangement process and the joining process, or between the joining process and the laser welding process, or after the laser welding process.

(4) The function(s) performed by a single element in the aforementioned embodiments may be performed by multiple elements. The function(s) performed by multiple elements may be performed by a single element. Part of the configuration of the aforementioned embodiments may be omitted. At least part of the configuration of the aforementioned embodiments may be added to or replaced by the configuration of the aforementioned other embodiments. All modes included in the technical idea specified by recitations in the accompanying claims are embodiments of the present disclosure.

15. Technical Ideas Disclosed by Present Disclosure

[Item 1]

A method for manufacturing a joined body comprising two plate-like portions that are plate-shaped portions, the method comprising:

forming a joint part that comprises at least a portion of each of the two plate-like portions and joins the two plate-like portions; and irradiating the joint part with a beam, thereby to perform laser welding, wherein the joint part comprises at least one folded part, the at least one folded part being defined as a bent part that is bent so as to be folded back in one of the two plate-like portions, and wherein a first base and a second base are formed at both ends of the bent part to face each other such that at least a portion of the other of the two plate-like portions is arranged between the first base and the second base, the other of the two plate-like portions including no bent part.

[Item 2]

The method for manufacturing a joined body according to Item 1, wherein the joint part is provided so as to protrude from one of the two plate-like portions, and wherein the beam irradiates the joint part from a side where a protruding part of the joint part is situated.

[Item 3]

The method for manufacturing a joined body according to Item 1 or Item 2, wherein the joined body further comprises a first member and a second member, the first member comprising one of the two plate-like portions, the second member comprising the other of the two plate-like portions, and wherein a flow path for a fluid is formed between the first member and the second member.

[Item 4]

The method for manufacturing a joined body according to any one of Item 1 through Item 3, wherein the at least one folded part comprises two folded parts formed on a portion included in the joint part of one of the two plate-like portions, and also the at least one folded part comprises one folded part formed on a portion included in the joint part of the other of the two plate-like portions.

[Item 5]

The method for manufacturing a joined body according to any one of Item 1 through Item 4, wherein, in the laser welding, the beam irradiates the joint part along a facing direction of the first and second bases.

[Item 6]

The method for manufacturing a joined body according to any one of Item 1 through Item 5, wherein the two plate-like portions are made of metal comprising aluminum as a main component.

[Item 7]

The method for manufacturing a joined body according to any one of Item 1 through Item 6, wherein the joined body further comprises a main body part adjacent to the joint part, wherein the first base is adjacent to the main body part, and wherein, through the laser welding, the first base is welded to a portion of the other of the two plate-like portions adjacent to the first base.

[Item 8]

The method for manufacturing a joined body according to any one of Item 1 through Item 7, wherein the joined body further comprises a main body part adjacent to the joint part, wherein the joint part extends in a specific direction, wherein, in the laser welding, the beam irradiates a portion of the joint part closer to the main body part than a center in a width direction of the joint part, and wherein the width direction is defined as a direction orthogonal to an extending direction of the joint part and to a facing direction of the first and second bases.

What is claimed is:

1. A method for manufacturing a joined body comprising a first member, a second member, and two plate-like portions that are made of metal comprising aluminum as a main component, the two plate-like portions being plate-shaped portions, with the first member comprising one of the two plate-like portions, and the second member comprising an other of the two plate-like portions, the method comprising:

forming a joint part that comprises at least a portion of each of the two plate-like portions and joins the two plate-like portions; and irradiating the joint part with a beam, thereby to perform laser welding, wherein the joint part comprises at least one folded part, the at least one folded part being defined as a bent part that is bent so as to be folded back in one of the two plate-like portions;

wherein two bases facing each other along a facing direction are formed at both ends of the bent part to face each other such that at least a portion of the other of the two plate-like portions is arranged between the two bases, the other of the two plate-like portions not including the bent part;

wherein the at least one folded part comprises two folded parts formed on a portion included in the joint part of one of the two plate-like portions, and also the at least one folded part comprises one folded part formed on a portion included in the joint part of the other of the two plate-like portions, wherein the joint part is provided so as to protrude from one of the two plate-like portions, wherein the joined body further comprises a main body part adjacent to the joint part, wherein a flow path for a fluid is formed between the first member and the second member, wherein the beam irradiates the joint part along the facing direction from a side where a protruding part of the joint part is situated, wherein, through the laser welding, each of the two bases in each of the at least one folded part is welded to a portion of the other of the two plate-like portions adjacent to the two bases, and a melted portion formed by the beam does not reach an opposite side of a portion of the joint part where the beam irradiates, wherein, in the laser welding, the beam irradiates a portion of the joint part closer to the main body part than a center in a width direction of the joint part, and wherein the width direction is defined as a direction orthogonal to an extending direction of the joint part and to the facing direction.

* * * * *